United States Patent
Jacobs

(10) Patent No.: US 11,077,720 B2
(45) Date of Patent: Aug. 3, 2021

(54) DUAL DOME CONVEX TIRE TREAD BLOCK OR TREAD RIB

(71) Applicant: COOPER TIRE & RUBBER COMPANY, Findlay, OH (US)

(72) Inventor: Jeremy J. Jacobs, Findlay, OH (US)

(73) Assignee: COOPER TIRE & RUBBER COMPANY, Findlay, OH (US)

( * ) Notice: Subject to any disclaimer, the term of this patent is extended or adjusted under 35 U.S.C. 154(b) by 579 days.

(21) Appl. No.: 15/560,447

(22) PCT Filed: Mar. 22, 2016

(86) PCT No.: PCT/US2016/023621
§ 371 (c)(1),
(2) Date: Sep. 21, 2017

(87) PCT Pub. No.: WO2016/154221
PCT Pub. Date: Sep. 29, 2016

(65) Prior Publication Data
US 2018/0072108 A1    Mar. 15, 2018

Related U.S. Application Data

(60) Provisional application No. 62/137,019, filed on Mar. 23, 2015.

(51) Int. Cl.
| | | |
|---|---|---|
| B60C 11/13 | (2006.01) | |
| B60C 11/00 | (2006.01) | |
| B60C 11/04 | (2006.01) | |

(52) U.S. Cl.
CPC ...... B60C 11/1376 (2013.01); B60C 11/0083 (2013.01); *B60C 11/04* (2013.01)

(58) Field of Classification Search
CPC ..... B60C 11/1392; B60C 11/11; B60C 11/13; B60C 11/1376
See application file for complete search history.

(56) References Cited

U.S. PATENT DOCUMENTS

| | | |
|---|---|---|
| 5,322,107 A | 6/1994 | Lagnier |
| 2002/0007889 A1 | 1/2002 | Eromaki |

(Continued)

FOREIGN PATENT DOCUMENTS

| | | | | |
|---|---|---|---|---|
| EP | 0602989 A1 | * | 6/1994 | .............. B60C 11/11 |
| JP | H03178809 | * | 8/1991 | |

(Continued)

OTHER PUBLICATIONS

Translation of JPH03178809 abstract.*

(Continued)

*Primary Examiner* — Nahida Sultana
*Assistant Examiner* — Asha A Thomas
(74) *Attorney, Agent, or Firm* — Fay Sharpe LLP

(57) ABSTRACT

Different sized, first and second domes are stacked, one atop the other on the surface of a rib or tread block of a tire. The lower, first dome spans a larger area of the tread. In one embodiment, the first dome covers the entire tread block or extends laterally across a rib. The upper, second dome is located on top of the first dome and spans only a portion of the first dome. The domes are either concentric or offset, or can be elliptical with the major axes of the ellipses oriented such that the major axes are optimized for a specific tread block or rib geometry. The major axes of the ellipses may be oriented parallel to or perpendicular to an axis of stiffness of the tread block or rib.

19 Claims, 5 Drawing Sheets

(56) References Cited

U.S. PATENT DOCUMENTS

| | | | |
|---|---|---|---|
| 2003/0136487 A1 | 7/2003 | Radulescu | |
| 2004/0045649 A1* | 3/2004 | Lopez | B60C 11/11 |
| | | | 152/209.1 |
| 2004/0231775 A1 | 11/2004 | Eromaki | |
| 2005/0167021 A1 | 8/2005 | Takahashi | |
| 2006/0108039 A1* | 5/2006 | Kaji | B60C 11/1392 |
| | | | 152/209.15 |
| 2016/0009143 A1 | 1/2016 | Kobayashi | |

FOREIGN PATENT DOCUMENTS

| | | |
|---|---|---|
| JP | 2004//058810 A | 2/2004 |
| KR | 2012/0007259 A | 1/2012 |
| WO | WO 2014/148260 A1 | 9/2014 |

OTHER PUBLICATIONS

EP 16 76 9556, Supplementary European Search Report and, dated Aug. 6, 2018.
PCT/US2016/023621, International Search Report and Written Opinion, dated Jun. 21, 2016.

* cited by examiner

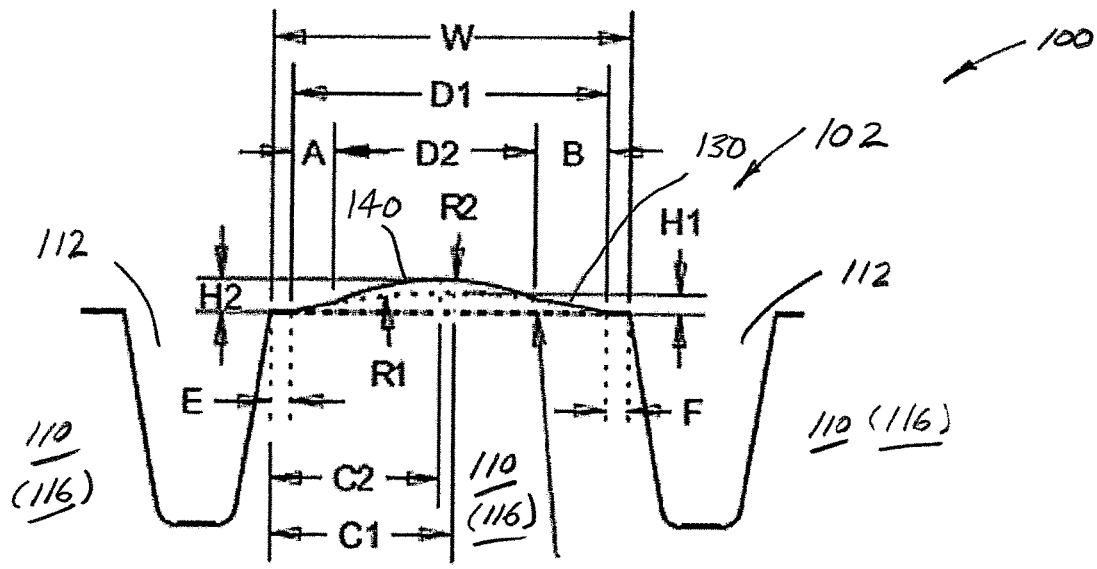

Figure 1

A = DISTANCE FROM EDGE OF DOME 1 TO LOCATION WHERE DOME 2 BEGINS
B = DISTANCE FROM OPPOSITE EDGE OF DOME 1 TO LOCATION WHERE DOME 2 ENDS
E = DISTANCE FROM EDGE OF TREAD BLOCK TO LOCATION WHERE DOME 1 BEGINS
F = DISTANCE FROM OPPOSITE EDGE OF TREAD BLOCK TO LOCATION WHERE DOME 1 ENDS
D1 = WIDTH OF DOME 1
D2 = WIDTH OF DOME 2
C1 = DISTANCE FROM EDGE OF TREAD BLOCK TO CENTER OF DOME 1
C2 = DISTANCE FROM EDGE OF TREAD BLOCK TO CENTER OF DOME 2
H1 = HEIGHT OF DOME 1 ABOVE THE NOMINAL PROFILE SURFACE
H2 = HEIGHT OF DOME 2 ABOVE THE NOMINAL PROFILE SURFACE
R1 = RADIUS OF DOME 1
R2 = RADIUS OF DOME 2
W = WIDTH OF TREAD BLOCK OR RIB IN LATERAL DIRECTION

Figure 2

| PARAMETER | MINIMUM | MAXIMUM | PREFERRED |
|---|---|---|---|
| W | 0.150" | 10.0" | 1.0"-1.5" |
| D1 | 50% W | 500% W | 100% W |
| D2 | 10% D1 | 95% D1 | 75% D1 |
| H1 | 0.002" | 0.300" | 0.008" |
| H2 | 0.004" | 0.302" | 0.015" |
| C1 | 0% W | 100% W | 50% W |
| C2 | 0% W | 100% W | 50% W |
| X1 | 0% L | 100% L | 50% L |
| X2 | 0% L | 100% L | 50% L |
| U | 0° | 90° | 0° |
| V | 0° | 90° | 0° |

US 11,077,720 B2

DUAL DOME CONVEX TIRE TREAD BLOCK OR TREAD RIB

This application claims the priority benefit of U.S. provisional application Ser. No. 62/137,019, filed Mar. 23, 2015, the entire disclosure of which is expressly incorporated herein by reference.

BACKGROUND

The present disclosure relates to tires, and more specifically to controlling normal stress distribution in tread blocks or ribs of tires. By reducing normal stresses in certain areas, such as the tread rib/block edges, irregular wear can be reduced.

There have been previous designs for a dome-shaped tread block, or tread rib. These designs have met with some success.

A need exists, however, for further improvements relating to controlling stresses, particularly in certain areas such as tread rib or tread blocks.

SUMMARY

Different sized, first and second domes are stacked, one atop the other on the surface of a rib or tread block. The lower, first dome spans a larger area in the tread. In one embodiment, the first dome covers the entire tread block or extends laterally across a rib. The upper, second dome is located on top of the first dome and spans only a portion of the first dome.

The first and second domes have a convex profile.

The centers of the first and second domes are either concentric or offset.

The dome shapes can be elliptical with the major axes of the ellipses oriented such that the major axes are optimized for a specific tread block or rib geometry.

The major axes of the ellipses may be oriented parallel to or perpendicular to an axis of stiffness of the tread block or rib, for example.

Radii of the first and second domes are angled relative to one another.

A radius of the first dome may be greater than one-half a lateral width of the rib or tread block.

A radius of at least one of the first and second domes may be greater than one-half a circumferential length of the tread block.

At least the first dome may have a substantially elliptical configuration, and a major radius of at least the first dome may be greater than either one-half a circumferential length of the tread block or one-half a width of the tread block, and a minor radius of at least the first dome may be greater than the other of either one-half a circumferential length of the tread block or one-half a width of the tread block.

A primary benefit of this disclosure is the ability to control stress distribution across the tread block or rib.

Another advantage resides in reducing stress at the edges of the tread blocks or ribs, and reducing the potential for irregular wear.

By controlling where the second dome begins and ends, as well as by having different combinations of the two radii associated with the first and second domes, the dual dome structure allows greater control of the stress distribution.

Increased control of stress distribution can also be achieved by having different combinations of two radii.

The dual-dome configuration allows for an asymmetric distribution where one side of the tread block or rib could have a different pressure distribution than the other side, simply by locating the second dome off-center from the first dome.

Benefits and advantages of the present disclosure will become more apparent from reading and understanding the following detailed description.

BRIEF DESCRIPTION OF THE DRAWINGS

FIG. 1 is a cross-sectional view of a dual dome rib or tread block.

FIG. 2 is a table of definitions of reference characters used in FIG. 1.

DETAILED DESCRIPTION

Figure 3:
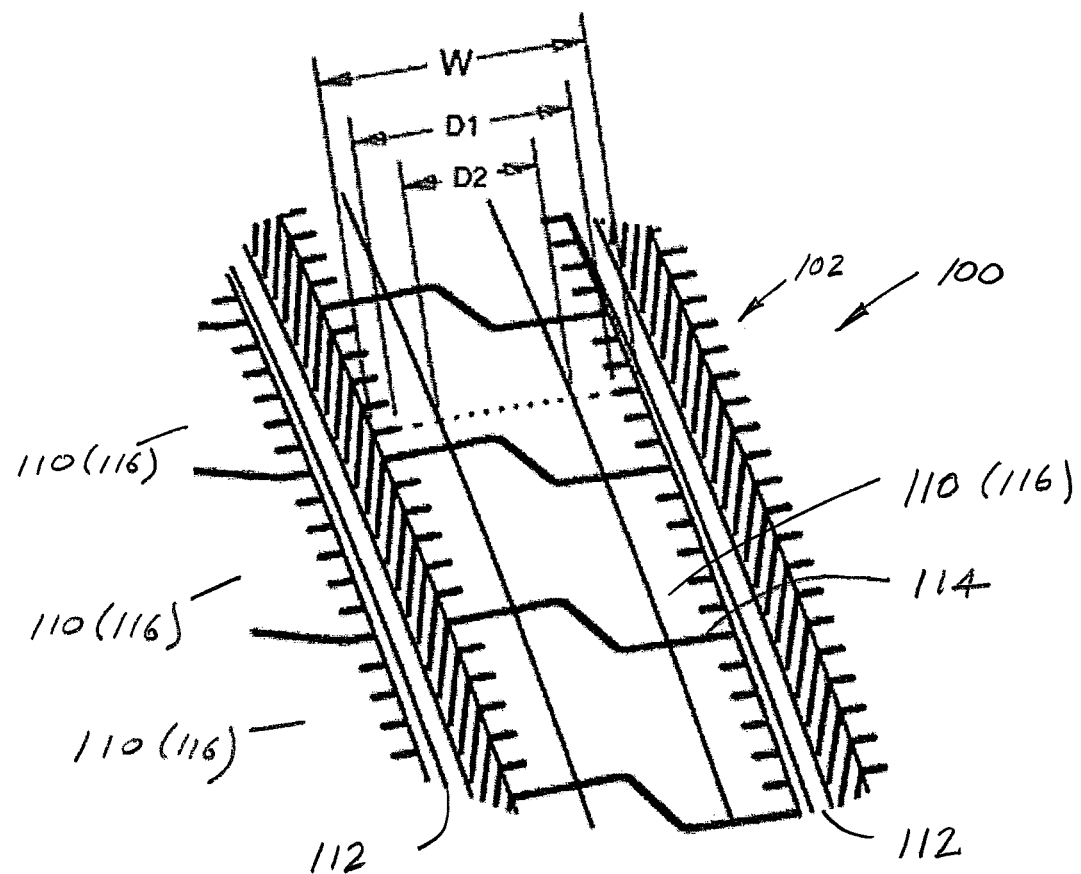
FIG. 3 is a perspective view of a tread/rib using a dual dome feature.

This disclosure relates to tires, and more particularly to tire treads, and that portion of the tire tread that forms a road engaging surface. Unless noted otherwise, typical terminology associated with tires and tire treads is used herein with its common meaning or understanding, such as "axial" or "lateral" is defined as a direction aligned with or parallel to the rotational axis of the tire, and "circumferential" is defined as the curvilinear direction of the outer surface (tread) of the tire that engages the ground or road surface. For purposes of this disclosure, the term "dome" as used herein is intended to describe and encompass partial, generally curvilinear or spheroid-shaped surfaces formed by one or more radii, e.g., circular or spherical-shaped domes formed by a radius, elliptical domes formed by major and minor axes with different radial dimensions, or combinations thereof. In this disclosure, the domes are convex shaped, smoothly contoured surfaces that extend outwardly from a remainder of the ground engaging surface of the tire tread, specifically extending outwardly from a circumferentially extending rib of the tread pattern or extending outwardly from a tread block.

Turning initially to FIGS. 1-4, there is shown a portion of a tire 100, namely a portion of a tire tread 102 that forms at least a portion of the ground or road engaging surface of the tire. The tire tread 102 extends over the road engaging surface between the shoulders of the tire 100, and includes ribs 110 and grooves 112 (circumferential), 114 (lateral) that may vary from one tread pattern to another tread pattern of a tire. The particular tread 102 is irrelevant to the present disclosure; however, the disclosure is used in connection with the individual ribs 110 that extend circumferentially around the tire 100 where the ribs are separated by circumferential grooves 112. Likewise, the present disclosure is applicable to individual tread blocks 116 that are defined both circumferentially (in a repeating pattern along the circumference) and laterally along the tread 102.

Figure 4:
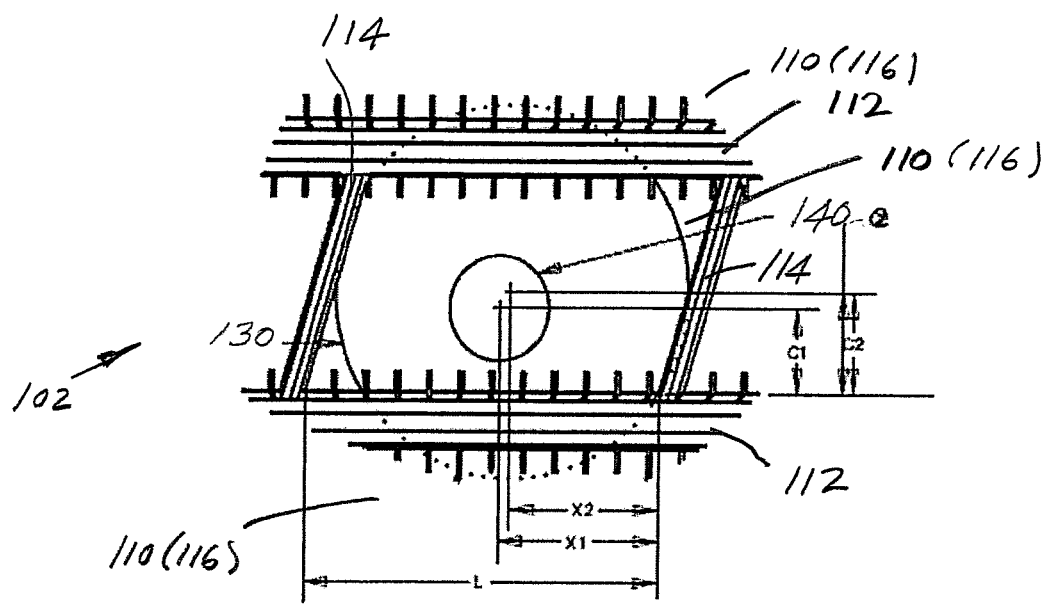
FIG. 4 is a top view of a tread block using a dual dome feature with non-concentric domes.
Figure 7:
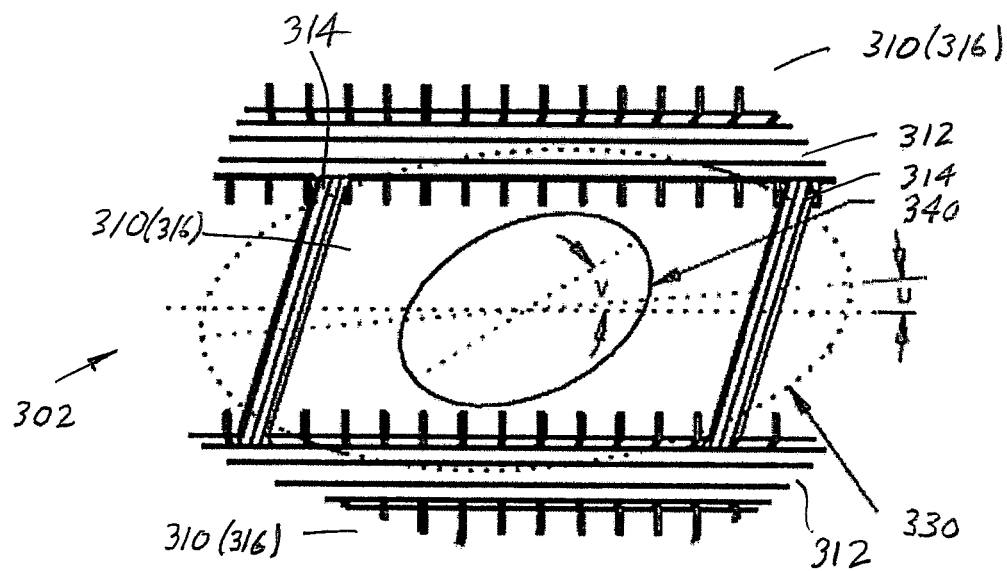
FIG. 7 is a top view of a tread block using a dual dome feature with off-angle ellipses.

For ease of understanding, the following reference characters identified in FIG. 2 and as used in various ones of the other figures are repeated below for ease of reference:

A=Distance From Edge Of Dome 1 To Location Where Dome 2 Begins
B=Distance From Opposite Edge Of Dome 1 to Location Where Dome 2 Ends
E=Distance From Edge Of Tread Block To Location Where Dome 1 Begins
F=Distance From Opposite Edge Of Tread Block To Location Where Dome 1 Ends
D1=Width Of Dome 1
D2=Width Of Dome 2
C1=Distance From Edge Of Tread Block To Center Of Dome 1
C2=Distance From Edge Of Tread Block To Center Of Dome 2
H1=Height Of Dome 1 Above The Nominal Profile Surface
H2=Height Of Dome 2 Above The Nominal Profile Surface
R1=Radius Of Dome 1
R2=Radius Of Dome 2
W=Width Of Tread Block Or Rib In Lateral Direction The same is true of the following reference characters associated with FIG. 4, or the later described FIG. 7:

X1=Circumferential Distance To Centerpoint Of Dome 1
C1=Lateral Distance To Centerpoint Of Dome 1
X2=Circumferential Distance To Centerpoint Of Dome 2
C2=Lateral Distance To Centerpoint Of Dome 2
U=Angle Of Major Axis For Dome 1 Relative To Circumferential Direction
V=Angle Of Major Axis For Dome 2 Relative To Circumferential Direction
L=Length Of Tread Block In The Circumferential Direction The tire tread 102 includes ribs 110 that extend in a circumferential direction and are divided in a lateral direction by grooves 112. A rib 110 may be circumferentially continuous or comprised of individual tread blocks 116 that are separated by generally laterally extending grooves 114 and together form the rib. As briefly noted in the Background, prior designs have employed a dome-shape on the road engaging surface of the tread block 116 or tread rib 110. The present disclosure is an improvement on such a design by employing a dual dome assembly or feature again on the road engaging surface of the tread rib 110 or tread block(s) 116.

More specifically, a first dome 130 is provided on the road engaging surface of the rib/tread block 110/116. The first dome 130 has a convex profile, i.e., the first dome protrudes outwardly from the road engaging surface of the rib/tread block 110/116. As shown, for example, in FIG. 4, the first dome 130 has a generally circular periphery, i.e., has a constant radius R1, and is shown in FIGS. 1 and 4 as extending over substantially the entire road engaging surface of the rib/tread block 110/116. The smoothly contoured surface configuration of the first dome 130 is desirable to reduce stress concentrations that would develop in the rib/tread block 110/116 as the tire 100 rotates and the rib/tread block engages the road surface (not shown). It is contemplated that the entire perimeter or outer edge of the first dome 130 may be contained within the perimeter of the rib/tread block 110/116 (e.g., FIG. 1), or alternately, the radius R1 may be greater than the distance C1 measured from the edge of a rib/tread block to a center of the first dome (e.g., FIG. 4) such that the smooth, spherical contour of the first dome extends to the perimeter edge of the rib/tread block. The broken line showing in FIG. 4 represents the hypothetical trace of the outer perimeter of the first dome 130 as measured from the center. As is evident, the dimension C1 is less than that of the radius R1 of the first dome 130 along substantial portions of those edges of the rib/tread block 110/116 shown in FIG. 4 that extend in the circumferential direction along the sidewalls of the circumferential grooves 112, and along reduced portions of those edges of the ribs/tread block that extend in the lateral direction along the sidewalls of the lateral grooves 114. Again, however, the specific dimensions of these portions of the edges of the ribs/tread block 110/116 may be reversed, the same, or greater or lesser dimensions without departing from the scope and intent of the present disclosure.

In addition, a second dome 140 is provided and located on top of the first dome 130. That is, the second dome 140 also has a convex profile, i.e., the second dome protrudes outwardly from the first dome 130 of the rib/tread block 110/116 and thus defines a height H2 greater than height H1 of the first dome (FIG. 1). As shown, for example, in FIG. 4, the second dome 140 has a generally circular periphery, i.e., has a constant radius R2. The centers of the first and second domes 130, 140 may be concentric or maybe circumferentially and/or laterally offset from one another (i.e., non-concentric). It is contemplated that the second dome 140 will likely have an outer perimeter substantially less than that of the first dome 130, although under certain circumstances, the outer perimeter of the second dome may be only slightly less than the outer perimeter of the first dome.

Figure 5:
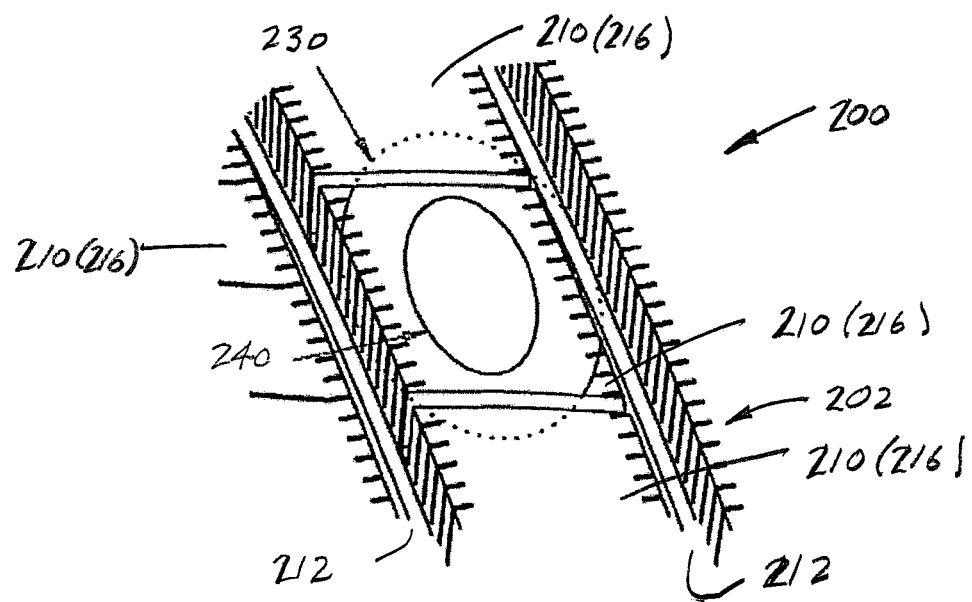
FIG. 5 is a perspective view of a tread block using a dual dome feature.
Figures 6, 8:
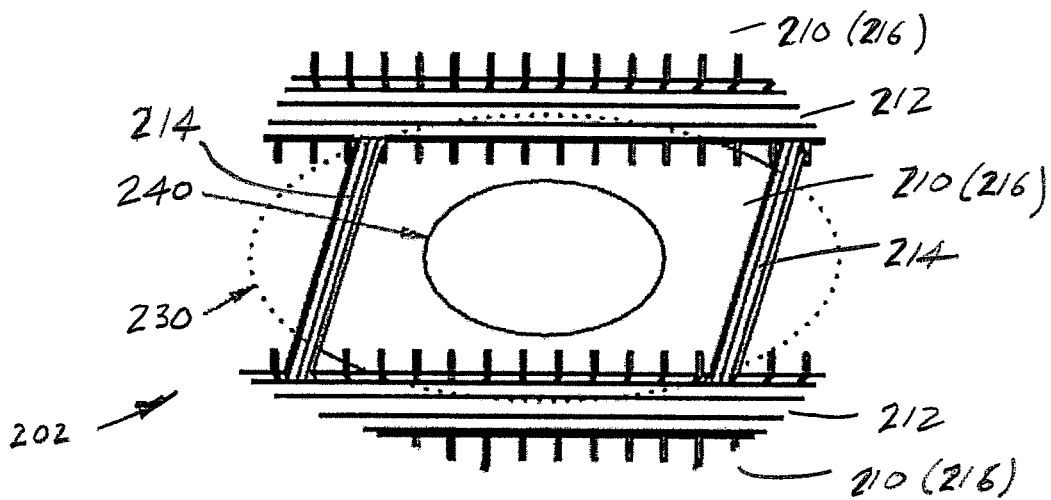
FIG. 6 is a top view of a tread block using a dual dome feature with an elliptical dome shape.
FIG. 8 is a table of representative dimensions and relative sizes of the various features of the dual domes.

In an alternate embodiment, one or both of the first and second domes 130, 140 may have different or varying radii so that either or both of the first and second dome may be non-spherical domes that nonetheless retain the desired feature of a smoothly contoured, generally curvilinear or spheroid surface that addresses the stress distribution issues associated with a rib/tread block 110/116. By way of example, FIGS. 5 and 6 illustrate first and second domes 230, 240 that both have a generally elliptical conformation. Other previously described features use reference numerals in the "200" series, e.g., lateral groove 114 in FIG. 1 is now identified as lateral groove 214 in FIGS. 5 and 6, and similarly tire 200, tire tread 202, ribs 210, and grooves 212 are illustrated in FIGS. 5 and/or 6. As illustrated, the major axes of each of the elliptically-shaped domes 230, 240 extend in the circumferential direction while the minor axes of each of these domes 230, 240 extend in the lateral direction. The dimensions of the major and minor axes of the first dome 230 are greater than the circumferential and lateral dimensions of the tread block 216 so that substantially the entirety of the road engaging surface area of the tread block has a smoothly contoured, generally curvilinear or spheroid conformation. The dimensions of the major and minor axes of the second dome 240 are both less than the circumferential and lateral dimensions of the tread block 216, although it is also understood that at least one of the axes may have a dimension greater than the underlying dimension of the first dome 230 or tread block. Further, the major and minor axes of the first and second domes 230, 240 are aligned with one another in the illustrated embodiment of FIGS. 5 and 6.

In FIG. 7, first and second domes 330, 340 are elliptically shaped but the major and minor axes of the first dome is disposed at an angle (greater than 0 and less than 90 degrees) relative to the circumferential and lateral directions of the tread block, and likewise at different angles than the major and minor axes the other second dome 340. Thus, angle U represents the angle of the major axis for the first dome 330 relative to the circumferential direction of the tire 300 while angle V represents the angle of the major axis for the second dome 340 relative to the circumferential direction of the tire. Of course the angles U or V could be the same or different. Other previously described features use reference numerals in the "300" series, e.g., lateral groove 114 in FIG. 1 is now identified as lateral groove 314 in FIG. 7, and similarly tire tread 302, ribs 310, grooves 312, and individual tread blocks 316 are illustrated in FIG. 7.

FIG. 8 is a table that identifies preferred minimum and maximum dimensions in a relative parameters of the width W of the rib/tread block 110/116, the widths D1, D2 of the respective first and second domes, respectively, the heights H1, H2 of the respective first and second domes, the distances C1, C2 from the edge of the tread block to the center of the respective first and second domes, the circumferential distances from the edge of the tread block to the center of the respective first and second domes, and the potential range of angles U, V of the major axes of the elliptically shaped first and second domes.

It will also be understood that the dual dome feature of the present disclosure is shown on only a selected rib or tread block in the accompanying figures for ease of illustration and description, but one skilled in the art will appreciate that the dual dome feature may be used on some or all ribs/tread blocks of a tire.

In summary, the disclosure shows and describes circular/elliptical first domes covering a rib/tread block with both centered and offset circular/elliptical second domes spanning only a portion of the first domes. The dual domes control stress distribution across the block. As a result, tread block edges and ribs have reduced wear. By effectively positioning the second dome off-center/angled or by positioning the axes of an elliptical dome, pressure distribution can be designed to reduce wear. It is also understood that the rib/tread block configurations can be interchanged into any tread pattern type, including a smooth tire tread that has no pattern at all. It is possible for the dome features themselves to act as the traction mechanism by creating variation in the stress distribution. In the case of a spherical dome, the center locations of the first and second domes can be independent of each other, and in a somewhat analogous manner, the primary axes of the ellipses can be angle relative to the tread geometry and to each other. It is also possible to have a combination of a spherical dome (either the first or second dome) and an elliptical dome (either the second or first dome, respectively). Through selective design of the first and second domes, the normal stress distribution in the ribs/tread blocks of the tire can be controlled. By reducing normal stresses in certain areas, such as the edges of the tread rib/block, irregular wear can be reduced. The dual-dome feature allows greater control of the stress distribution by controlling where the second or upper dome begins and ends, as well as by having different combinations of the radii. Use of the dual dome feature also advantageously allows for an asymmetric distribution where one side of the rib/tread block could have a different pressure distribution from the other side of the rib/tread block simply by placing the second dome off-center from the first dome. Likewise, manipulating the orientation of the major axes of elliptically-shaped domes allows for optimization relative to specific tread block geometry, e.g., the major axes of the ellipses may be oriented parallel to or perpendicular to the axis of stiffness of the tread block.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

The invention claimed is:

1. A tire having an axis about which the tire rotates, the tire comprising:
a tread block or rib used in a tire tread of the tire;
different sized first and second domes provided on a road engaging first surface of the tread block or rib wherein the first dome is disposed on the first surface,
the second dome is located on top of the first dome, wherein each of the first and second domes has a convex profile on the first surface of the tread block or rib, the first dome forming a first spheroid-shaped surface defined by a first radius of curvature in a cross-section of the tire perpendicular to the tire axis, and the second dome forming a second spheroid-shaped surface defined by a second radius of curvature in a cross-section of the tire perpendicular to the tire axis wherein the first radius of curvature is different from the second radius of curvature.

2. The tire of claim 1 wherein centers of the first and second domes are concentric.

3. The tire of claim 1 wherein centers of the first and second domes are offset relative to one another.

4. The tire of claim 1 wherein the radii of the first and second domes are angled relative to one another.

5. The tire of claim 4 wherein at least one of the radii is at an angle greater than zero and less than ninety degrees relative to a circumferential direction of the tire.

6. The tire of claim 1 wherein the radius of the first dome is greater than one-half a lateral width of the rib or tread block.

7. The tire of claim 6 wherein the radius of at least one of the first and second domes is greater than one-half a circumferential length of the tread block or rib.

8. The tire of claim 1 wherein the radius of at least one of the first and second domes is greater than one-half a circumferential length of the tread block or rib.

9. The tire of claim 1 wherein the first dome has a substantially elliptical configuration, and the radius thereof has a major radius greater than either one-half a circumferential length of the tread block or one-half a width of the tread block or rib, and a minor radius greater than the other of either one-half a circumferential length of the tread block or rib or one-half a width of the tread block or rib.

10. The tire of claim 1 wherein a height of the first dome above a nominal profile of the first surface ranges from 0.002" to 0.008".

11. The tire of claim 10 wherein a height of the second dome above a nominal profile of the first surface ranges from 0.004" to 0.015".

12. The tire of claim 1 wherein a width dimension of the first dome ranges from 50% to 500% of a width of the rib or tread block.

13. The tire of claim 1 wherein a width dimension of the second dome ranges from 10% to 95% of a width dimension of the first dome.

14. The tire of claim 1 wherein the first dome has a substantially elliptical configuration and the radius thereof includes a major radius and a minor radius, the radii of the first dome are greater than both a width dimension and a circumferential dimension of the tread block or rib, the second dome has a substantially elliptical configuration and the radius thereof includes a major radius and a minor radius, and the radii of the second dome are less than both the width dimension and the circumferential dimension of the tread block or rib.

15. A tire having a central axis comprising:
a tread block or rib used in a tire tread of the tire;
different sized first and second domes provided on a road engaging first surface of the tread block or rib, each of the first and second domes having a convex profile with respect to the road engaging first surface where the convex profiles are defined by radii with center points located radially inward of the road engaging first surface wherein the first dome is disposed on the first surface, and the second dome is located on top of the first dome, wherein at least one of the first and second domes has a substantially elliptical configuration.

16. The tire of claim 15 wherein the radii of the first and second domes are angled relative to one another.

17. The tire of claim 16 wherein at least one of the radii is at an angle greater than zero and less than ninety degrees relative to a circumferential rotational direction of the tire.

18. A tire having a central axis comprising:
a tread block or rib used in a tire tread of the tire;
different sized first and second domes provided on a road engaging first surface of the tread block or rib, each of the first and second domes having a convex profile with respect to the road engaging first surface where the convex profiles are defined by radii with center points located radially inward of the road engaging first surface wherein the first dome is disposed on the first surface, and the second dome is located on top of the first dome, wherein the radius of the first dome is greater than both a width dimension and a circumferential dimension of the tread block or rib.

19. The tire of claim 18 wherein the radius of the second dome is less than both the width dimension and the circumferential dimension of the tread block or rib.

* * * * *